US012806796B2

(12) United States Patent
Maki

(10) Patent No.: US 12,806,796 B2
(45) Date of Patent: Nov. 24, 2026

(54) SUBSTRATE POSITIONING DEVICE, SUBSTRATE POSITIONING METHOD, AND BONDING APPARATUS

(71) Applicant: Tokyo Electron Limited, Tokyo (JP)

(72) Inventor: Tetsuya Maki, Koshi City (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 316 days.

(21) Appl. No.: 18/595,890

(22) Filed: Mar. 5, 2024

(65) Prior Publication Data

US 2024/0300113 A1 Sep. 12, 2024

(30) Foreign Application Priority Data

Mar. 7, 2023 (JP) ................................. 2023-034962

(51) Int. Cl.

*H10P 72/00* (2026.01)
*B25J 9/12* (2006.01)
*B25J 9/16* (2006.01)
*B25J 11/00* (2006.01)
*B25J 19/00* (2006.01)

(52) U.S. Cl.

CPC ........... *B25J 11/0095* (2013.01); *B25J 9/126* (2013.01); *B25J 9/1697* (2013.01); *B25J 19/0091* (2013.01)

(58) Field of Classification Search

CPC .............................. B25J 11/0095; H10P 72/50
See application file for complete search history.

(56) References Cited

U.S. PATENT DOCUMENTS 5,676,360 A * 10/1997 Boucher .............. B23Q 16/105 269/57
6,390,901 B1 * 5/2002 Hiyama .................. B24B 37/11 451/287
10,818,538 B2 * 10/2020 Mashimo ............ H10P 72/7608
11,148,258 B2 * 10/2021 Grund ................... B25B 11/005
2009/0324813 A1 * 12/2009 Ueno ....................... G11B 5/84 118/500
2024/0300113 A1 * 9/2024 Maki .................... B25J 11/0095

FOREIGN PATENT DOCUMENTS

JP 2018-147944 A 9/2018

* cited by examiner

*Primary Examiner* — Lee D Wilson
(74) *Attorney, Agent, or Firm* — Chrisman Gallo Tochtrop LLC

(57) ABSTRACT

A substrate positioning device includes a holder configured to hold a substrate; and a rotating mechanism configured to rotate the holder. The rotating mechanism includes a rotation shaft fixed to the holder; a bearing configured to support the rotation shaft in a non-contact manner; a base configured to fix the bearing; a first driver configured to rotate the rotation shaft; a damping mechanism comprising a fixed member connected to one of the base and the rotation shaft, and a moving member connected to the other and configured to be slid with respect to the fixed member, the damping mechanism being configured to generate a damping force against a relative motion between the rotation shaft and the base; a locking mechanism configured to lock the moving member; and a second driver configured to micro-drive the damping mechanism to which the moving member is fixed.

14 Claims, 10 Drawing Sheets

SUBSTRATE POSITIONING DEVICE, SUBSTRATE POSITIONING METHOD, AND BONDING APPARATUS

CROSS-REFERENCE TO RELATED APPLICATION

This application claims the benefit of Japanese Patent Application No. 2023-034962 filed on Mar. 7, 2023, the entire disclosures of which are incorporated herein by reference.

TECHNICAL FIELD

The various aspects and embodiments described herein pertain generally to a substrate positioning device, a substrate positioning method, and a bonding apparatus.

BACKGROUND

Conventionally, there is known a bonding apparatus for bonding substrates such as semiconductor wafers (see, for example, Patent Document 1).

Patent Document 1: Japanese Patent Laid-open Publication No. 2018-147944

SUMMARY

In one exemplary embodiment, a substrate positioning device includes a holder configured to hold a substrate; and a rotating mechanism configured to rotate the holder. The rotating mechanism includes a rotation shaft; a bearing; a base; a first driver; a damping mechanism; a locking mechanism; and a second driver. The rotation shaft is fixed to the holder. The bearing is configured to support the rotation shaft in a non-contact manner. The base is configured to fix the bearing. The first driver is configured to rotate the rotation shaft. The damping mechanism includes a fixed member connected to a first one of the base and the rotation shaft, and a moving member connected to a second one of the base and the rotation shaft and configured to be slid with respect to the fixed member, and the damping mechanism is configured to generate a damping force against a relative motion between the rotation shaft and the base. The locking mechanism is configured to lock the moving member. The second driver is configured to micro-drive the damping mechanism to which the moving member is fixed.

The foregoing summary is illustrative only and is not intended to be any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
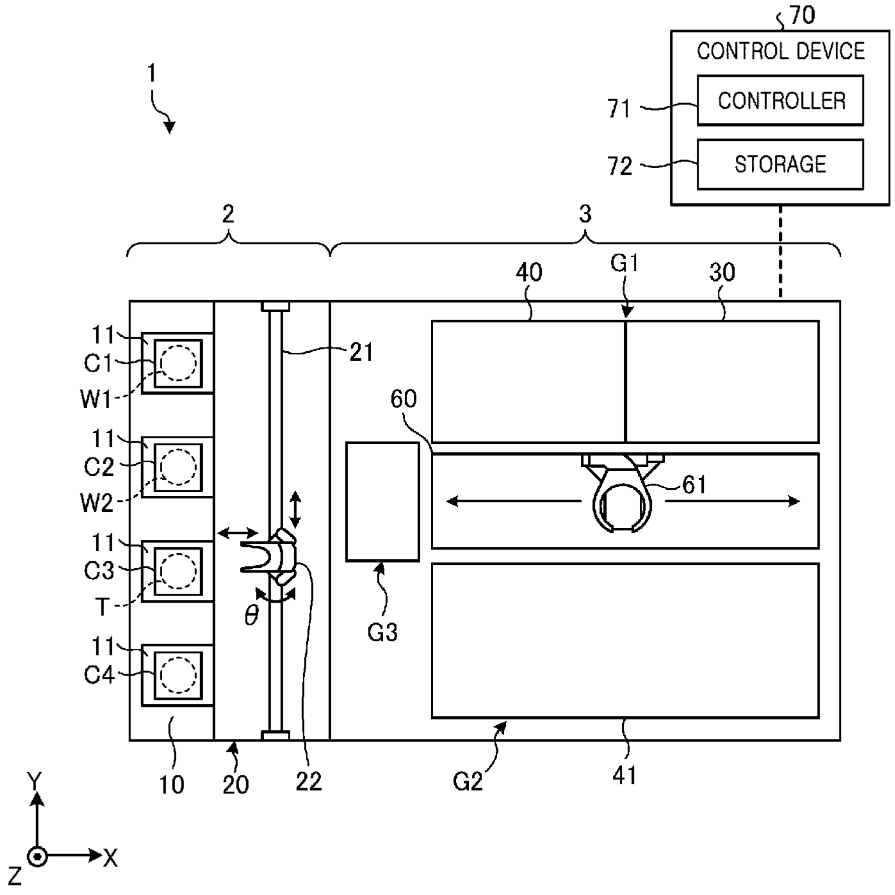
FIG. 1 is a schematic diagram illustrating a configuration of a bonding system according to an exemplary embodiment.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current exemplary embodiment. Still, the exemplary embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

Hereinafter, embodiments for a substrate positioning device, a substrate positioning method, and a bonding apparatus according to the present disclosure (hereinafter, referred to as "exemplary embodiments") will be described in detail with reference to the accompanying drawings. Further, it should be noted that the present disclosure is not limited by the exemplary embodiments. Further, unless processing contents are contradictory, the various exemplary embodiments can be appropriately combined. Furthermore, in the various exemplary embodiments to be described below, same parts will be assigned same reference numerals, and redundant description will be omitted.

Further, in the following exemplary embodiments, expressions such as "constant," "perpendicular," "vertical" and "parallel" may be used. These expressions, however, do not imply strictly "constant", "perpendicular," "vertical" and "parallel". That is, these expressions allow some tolerable errors in, for example, manufacturing accuracy, installation accuracy, or the like.

Moreover, in the various accompanying drawings, for the purpose of clear understanding, there may be used a rectangular coordinate system in which the X-axis direction, Y-axis direction and Z-axis direction which are orthogonal to one another are defined and the positive Z-axis direction is defined as a vertically upward direction. Further, a rotational direction around a vertical axis may be referred to as "θ direction."

In a bonding apparatus for bonding substrates to each other, positioning of the substrates in a rotational direction thereof is performed before the substrates are bonded to each other. Improvement in precision of this positioning in the rotational direction leads to improvement in bonding precision of the substrates. Therefore, it is required to improve the positioning precision for the substrate in the rotational direction thereof.

Further, the improving the positioning precision for the substrate in the rotational direction is not limited to the bonding apparatus, but is also required for other devices such as a substrate inspection device (prober) without being limited to the bonding apparatus. Below, an embodiment in which the substrate positioning device and the substrate positioning method according to the present disclosure are applied to the bonding apparatus will be described. However, it should be noted that the substrate positioning device and the substrate positioning method according to the present disclosure are also applicable to various devices other than the bonding apparatus.

<Configuration of Bonding System>

Figure 2:
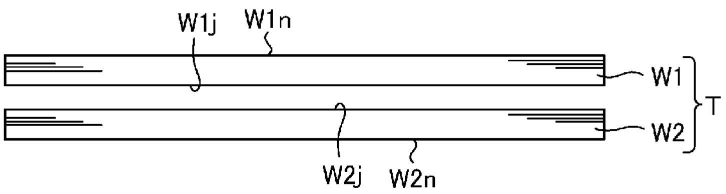
FIG. 2 is a schematic diagram illustrating a state of a first substrate and a second substrate before they are bonded according to the exemplary embodiment.

First, a configuration of a boding system according to an exemplary embodiment will be described with reference to FIG. 1 and FIG. 2. FIG. 1 is a schematic diagram illustrating the configuration of the bonding system according to the exemplary embodiment. FIG. 2 is a schematic diagram illustrating a state of a first substrate and a second substrate before they are bonded according to the exemplary embodiment.

A bonding system 1 shown in FIG. 1 is configured to form a combined substrate T by bonding a first substrate W1 and a second substrate W2 (see FIG. 2).

The first substrate W1 and the second substrate W2 are single crystalline silicon wafers, and a multiple number of electronic circuits are formed on their plate surfaces. The first substrate W1 and the second substrate W2 have the substantially same diameter. Alternatively, either one of the first substrate W1 and the second substrate W2 may be a substrate on which no electronic circuit is formed.

In the following description, as shown in FIG. 2, among plate surfaces of the first substrate W1, a plate surface to be bonded to the second substrate W2 will be referred to as "bonding surface W1*j*", and a plate surface opposite to the bonding surface W1*j* will be referred to as "non-bonding surface W1*n*". Further, among plate surfaces of the second substrate W2, a plate surface to be bonded to the first substrate W1 will be referred to as "bonding surface W2*j*", and a plate surface opposite to the bonding surface W2*j* will be referred to as "non-bonding surface W2*n*".

As depicted in FIG. 1, the bonding system 1 includes a carry-in/out station 2 and a processing station 3. The carry-in/out station 2 is disposed on the negative X-axis side of the processing station 3, and is connected as a single body with the processing station 3.

The carry-in/out station 2 includes a placing table 10 and a transfer section 20. The placing table 10 is equipped with a multiple number of placing plates 11. Respectively provided on the placing plates 11 are cassettes C1 to C4 each of which accommodates therein a plurality of (e.g., 25 sheets of) substrates horizontally. The cassette C1 accommodates therein a plurality of first substrates W1; the cassette C2, a plurality of second substrates W2; and the cassette C3, a plurality of combined substrates T. The cassette C4 is a cassette for collecting, for example, a defective substrate. Further, the number of the cassettes C1 to C4 placed on the placing plates 11 is not limited to the shown example.

The transfer section 20 is provided adjacent to the positive X-axis side of the placing table 10. Provided in the transfer section 20 are a transfer path 21 extending in the Y-axis direction and a transfer device 22 configured to be movable along the transfer path 21. The transfer device 22 is configured to be movable in the X-axis direction as well as in the Y-axis direction and pivotable around the Z-axis. The transfer device 22 transfers the first substrates W1, the second substrates W2, and the combined substrates T between the cassettes C1 to C4 placed on the placing plates 11 and a third processing block G3 of the processing station 3 to be described later.

The processing station 3 is provided with, for example, three processing blocks G1, G2 and G3. The first processing block G1 is disposed on the rear side (positive Y-axis side of FIG. 1) of the processing station 3. Further, the second processing block G2 is provided on the front side (negative Y-axis side of FIG. 1) of the processing station 3, and the third processing block G3 is disposed on the carry-in/out station 2 side (negative X-axis side of FIG. 1) of the processing station 3.

Disposed in the first processing block G1 is a surface modifying apparatus 30 configured to modify the bonding surface W1*j* of the first substrate W1 and the bonding surface W2*j* of the second substrate W2. The surface modifying apparatus 30 cuts a $SiO_2$ bond on the bonding surfaces W1*j* and W2*j* of the first and second substrates W1 and W2 into a single bond of SiO, thus allowing the bonding surfaces W1*j* and W2*j* to be modified so that they are easily hydrophilized afterwards.

Specifically, in the surface modifying apparatus 30, an oxygen gas or a nitrogen gas as a processing gas is excited into plasma under, for example, a decompressed atmosphere to be ionized. As these oxygen ions or nitrogen ions are radiated to the bonding surfaces W1*j* and W2*j* of the first and second substrates W1 and W2, the bonding surfaces W1*j* and W2*j* are modified by being plasma-processed.

Further, in the first processing block G1, a surface hydrophilizing apparatus 40 is disposed. The surface hydrophilizing apparatus 40 is configured to hydrophilize and clean the bonding surfaces W1*j* and W2*j* of the first and second substrates W1 and W2 with, for example, pure water. To elaborate, the surface hydrophilizing apparatus 40 supplies the pure water onto the first substrate W1 or the second substrate W2 while rotating the first substrate W1 or the second substrate W2 held by, for example, a spin chuck. Accordingly, the pure water supplied onto the first substrate W1 or the second substrate W2 is diffused on the bonding surface W1*j* of the first substrate W1 or the bonding surface W2*j* of the second substrate W2, so that the bonding surfaces W1*j* and W2*j* are hydrophilized.

Here, although the surface modifying apparatus 30 and the surface hydrophilizing apparatus 40 are arranged side by side, the surface hydrophilizing apparatus 40 may be stacked on top of or under the surface modifying apparatus 30.

In the second processing block G2, a bonding apparatus 41 is disposed. The boning apparatus 41 is configured to bond the hydrophilized first and second substrates W1 and W2 by an intermolecular force. A specific configuration of the bonding apparatus 41 will be described later.

A transfer section 60 is formed in a region surrounded by the first processing block G1, the second processing block G2, and the third processing block G3. A transfer device 61 is disposed in the transfer section 60. The transfer device 61 has a transfer arm configured to be movable in a vertical direction and a horizontal direction and pivotable around a vertical axis, for example. This transfer device 61 is moved within the transfer section 60 and transfers the first substrate W1, the second substrate W2 and the combined substrate T to preset apparatuses within the first processing block G1, the second processing block G2, and the third processing block G3 which are adjacent to the transfer section 60.

Furthermore, the bonding system 1 is equipped with a control device 70. The control device 70 controls an operation of the bonding system 1. This control device 70 may be implemented by, for example, a computer, and includes a controller 71 and a storage 72. The controller 71 includes a microcomputer having a CPU (Central Processing Unit), a ROM (Read Only Memory), a RAM (Random Access Memory), an input/output port, and so forth as well as various kinds of circuits. The CPU of the microcomputer implements a control to be described later by reading out and executing a program stored in the ROM. Further, the storage 72 may be implemented by, for example, a semiconductor memory device such as a RAM or a flash memory, or a storage device such as a hard disk or an optical disk.

Further, the program may have been recorded on a computer-readable recording medium, and may be installed from the recording medium to the storage 72 of the control device 70. The computer-readable recording medium may be, by way of non-limiting example, a hard disk HD, a flexible disk FD, a compact disk CD, a magnetic optical disk MO, a memory card, or the like.

<Configuration of Bonding Apparatus>

Figure 3:
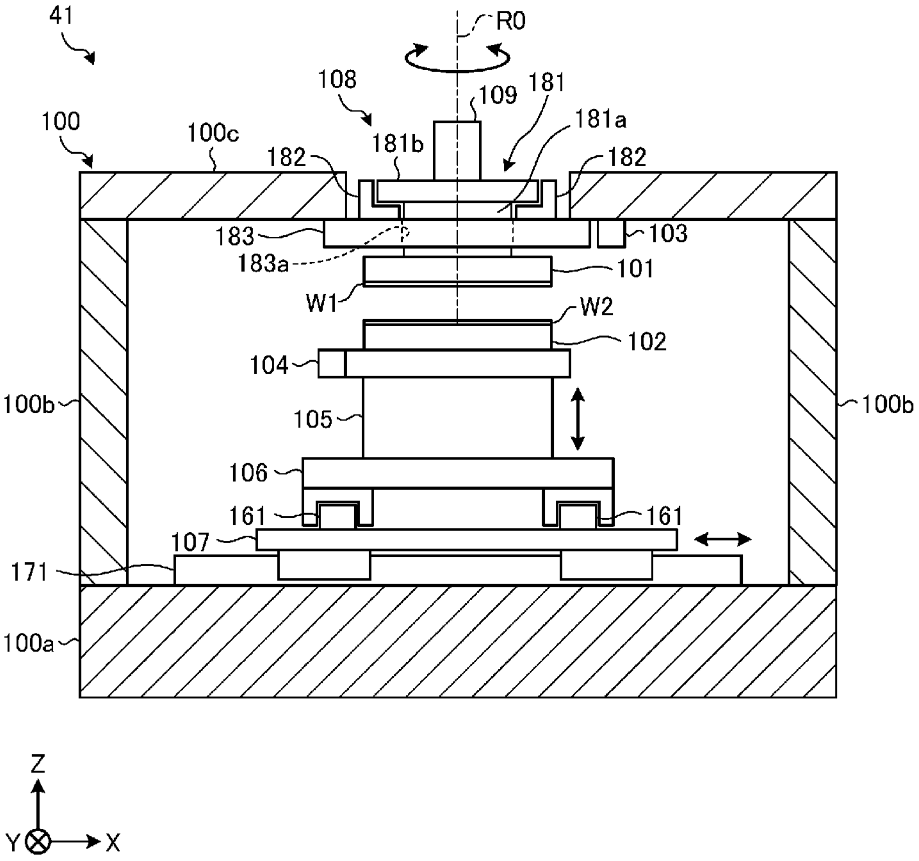
FIG. 3 is a schematic diagram illustrating a configuration of a bonding apparatus.

Now, a configuration of the bonding apparatus 41 will be explained with reference to FIG. 3. FIG. 3 is a schematic diagram illustrating the configuration of the bonding apparatus 41 according to the exemplary embodiment.

As depicted in FIG. 3, the bonding apparatus 41 includes a housing 100, a first holder 101, and a second holder 102. The bonding apparatus 41 is further equipped with an upper imaging device 103 and a lower imaging device 104. Further, the bonding apparatus 41 additionally includes an elevating mechanism 105 (an example of a moving mechanism), a first horizontally moving device 106, a second horizontally moving device 107, a rotating mechanism 108, and a linearly moving device 109.

The housing 100 includes, for example, a base 100*a*, a plurality of supporting columns 100*b* standing on the base 100*a*, and a beam member 100*c* put on the plurality of supporting columns 100*b*.

The first holder 101 is, for example, a vacuum chuck, and is connected to a non-illustrated suction device such as a vacuum pump. The first holder 101 is configured to attract and hold the first substrate W1 from above by suctioning the first substrate W1 positioned on an attraction surface (bottom surface of the first holder 101) with a suction force generated by the suction device. A specific configuration of the first holder 101 will be described later.

The second holder 102 is, for example, a vacuum chuck, and is connected to a non-illustrated suction device such as a vacuum pump. The second holder 102 is configured to attract and hold the second substrate W2 from below by suctioning the second substrate W2 with a suction force generated by the suction device.

The upper imaging device 103 is configured to image the top surface (bonding surface W2*j*) of the second substrate W2 held by the second holder 102. The upper imaging device 103 is mounted to the beam member 100*c* of the housing 100, for example. The upper imaging device 103 may be implemented by, for example, a CCD (Charge Coupled Device) camera or the like.

The lower imaging device 104 is configured to image the bottom surface (bonding surface W1*j*) of the first substrate W1 held by the first holder 101. The lower imaging device 104 is mounted to a lateral side of the elevating mechanism 105, for example. The lower imaging device 104 may be implemented by, by way of non-limiting example, a CCD camera or the like.

The second holder 102 is fixed to the elevating mechanism 105 provided below the second holder 102. The elevating mechanism 105 is configured to move the second holder 102 along the vertical direction (Z-axis direction).

The elevating mechanism 105 is fixed to the first horizontally moving device 106 provided below the elevating mechanism 105. The first horizontally moving device 106 is configured to move the elevating mechanism 105 along a horizontal direction. Specifically, a pair of rails 161 extending along the Y-axis direction are provided under the first horizontally moving device 106, and the first horizontally moving device 106 is moved along the pair of rails 161, thus allowing the elevating mechanism 105 to be moved along the Y-axis direction.

The pair of rails 161 are fixed to the second horizontally moving device 107. The second horizontally moving device 107 is configured to move the first horizontally moving device 106 along a horizontal direction via the pair of rails 161. To elaborate, a pair of rails 171 extending along the X-axis direction are provided under the second horizontally moving device 107. The second horizontally moving device 107 is moved along the pair of rails 171, thus allowing the first horizontally moving device 106 to be moved along the X-axis direction via the pair of rails 161. The pair of rails 171 are fixed to the base 100*a* of the housing 100.

The first holder 101 is fixed to the rotating mechanism 108 provided above the first holder 101. The rotating mechanism 108 is configured to rotate the first holder 101 around a vertical axis (Z axis), whereby the position of the first substrate W1 held by the first holder 101 in the θ direction is adjusted.

The rotating mechanism 108 includes a rotation shaft 181 fixed to the first holder 101, a plurality of air bearings 182 configured to support the rotation shaft 181 in a non-contact manner, and a base 183 configured to fix the plurality of air bearings 182.

The rotation shaft 181 is equipped with, by way of example, a cylindrical member 181*a* extending in a vertical direction, and a flange member 181*b* provided at an upper portion of the cylindrical member 181*a*. The first holder 101 is fixed to a bottom surface of the flange member 181*b*.

The plurality of air bearings 182 are disposed around the flange member 181*b* of the rotation shaft 181. In the exemplary embodiment, the rotating mechanism 108 is provided with four air bearings 182 (see FIG. 5 to be described below). The four air bearings 182 are evenly arranged at an annular distance of 90 degrees in a circumferential direction of the flange member 181*b*. Thus, two of the four air bearings 182 are arranged to face each other with a center of the flange member 181*b* (that is, a center of the rotation shaft 181) therebetween, and the rest two are also disposed to face each other with the center of the flange member 181*b* therebetween.

In addition, here, the rotating mechanism 108 may be provided with a single air bearing formed in an annular shape, instead of the plurality of air bearings 182.

The plurality of air bearings 182 eject compressed air vertically upwards from below the flange member 181*b* toward the bottom surface of the flange member 181*b* (an example of a bearing surface), thus allowing the rotation shaft 181 to be lifted. Further, the plurality of air bearings 182 eject compressed air from the outside of the flange member 181*b* toward a circumferential side surface of the flange member 181*b* (an example of a bearing surface). Specifically, each air bearing 182 ejects the compressed air along a radial direction of the flange member 181*b* (a direction along a dash dotted line shown in FIG. 5). In other words, each air bearing 182 ejects the compressed air toward another air bearing 182 that is disposed opposite therefrom with the center of the flange member 181*b* therebetween.

The compressed air ejected from the plurality of air bearings 182 in a horizontal direction presses the rotation shaft 181 in the horizontal direction. A position where the forces pressing the rotation shaft 181 in the horizontal direction are balanced becomes a rotation center RO (see FIG. 5) of the rotation shaft 181.

The base 183 is, for example, a flat plate-shaped member, and is fixed to the beam member 100*c* of the housing 100. The plurality of air bearings 182 described above are fixed to a top surface of the base 183.

In addition, a through hole 183*a* is formed through the base 183 in a vertical direction. The through hole 183*a* has a larger diameter than the cylindrical member 181*a* of the rotation shaft 181 described above. The cylindrical member 181*a* of the rotation shaft 181 is inserted into this through hole 183*a*. The flange member 181*b* of the rotation shaft 181 is disposed above the base 183. In this way, the rotation shaft 181 is not in contact with the base 183.

As described above, the rotating mechanism 108 according to the exemplary embodiment supports the rotation shaft 181 in the non-contact manner by using the plurality of air bearings 182. Accordingly, as compared to a case where the rotation shaft 181 is supported by using a contact-type bearing member such as a ball bearing, the rotating mechanism 108 can be rotated with a very small force. Therefore, the rotating mechanism 108 according to the embodiment can achieve high responsiveness even when it rotates the rotation shaft 181 at a nanometer (nm) level, for example.

However, the method of supporting the rotation shaft 181 in the non-contact manner may raise a risk in terms of stability of the rotation shaft 181. That is, as stated above, the rotation center RO of the rotation shaft 181 is formed by the balancing of the forces of the compressed air ejected from the plurality of air bearings 182 in the horizontal direction. However, there is a risk that this balanced position may be slightly shifted due to a slight external force such as vibration, for example. For this reason, it is difficult to maintain the rotation center RO of the rotation shaft 181 with high precision in the method of supporting the rotation shaft 181 in the non-contact manner. This problem of stability becomes particularly conspicuous when the rotation shaft 181 is rotated at the nanometer level.

The deviation of the rotation center RO of the rotation shaft 181 leads to a decrease in bonding precision between the first substrate W1 and the second substrate W2. In view of this, it is desirable to suppress the deviation of the rotation center RO of the rotation shaft 181 as much as possible.

As a resolution, in the rotating mechanism 108 according to the exemplary embodiment, the stability of the rotation shaft 181 is improved by providing a damping mechanism configured to provide resistance to the driving of the rotation shaft 181. As the stability of the rotation shaft 181 is thus improved, the rotating mechanism 108 according to the exemplary embodiment is capable of improving positioning precision of the first substrate W1 in a rotational direction.

In addition, the rotating mechanism 108 according to the exemplary embodiment further includes a locking mechanism configured to lock an operation of the damping mechanism, and a second driver configured to finely drive the damping mechanism with its operation locked. With this configuration, the rotating mechanism 108 according to the exemplary embodiment is capable of appropriately suppressing the slight positional deviation of the rotation shaft 181 that may occur before the first substrate W1 and the second substrate W2 are bonded after the positioning of the first substrate W1 in the rotational direction is performed. A specific configuration of the rotating mechanism 108 will be described later.

The linearly moving device 109 is disposed on the rotation shaft 181, for example. The linearly moving device 109 includes a striker configured to press a central portion of the first substrate W1 held by the first holder 101; and a delivery device configured to receive the first substrate W1 from the transfer device 61 and hands it over to the first holder 101. A specific configuration of the linearly moving device 109 will be described later.

Further, although not shown here, the bonding apparatus 41 is equipped with a transition device, a position adjusting mechanism, an inverting mechanism, and so forth at a leading end of the first holder 101 or the second holder 102 shown in FIG. 3. The transition device is configured to temporarily accommodate therein the first substrate W1, the second substrate W2, and the combined substrate T. The position adjusting mechanism is configured to adjust the directions of the first substrate W1 and the second substrate W2 in the horizontal direction. The inverting mechanism is configured to invert the front and rear surfaces of the first substrate W1.

<Configuration of First Holder>

Figure 4:
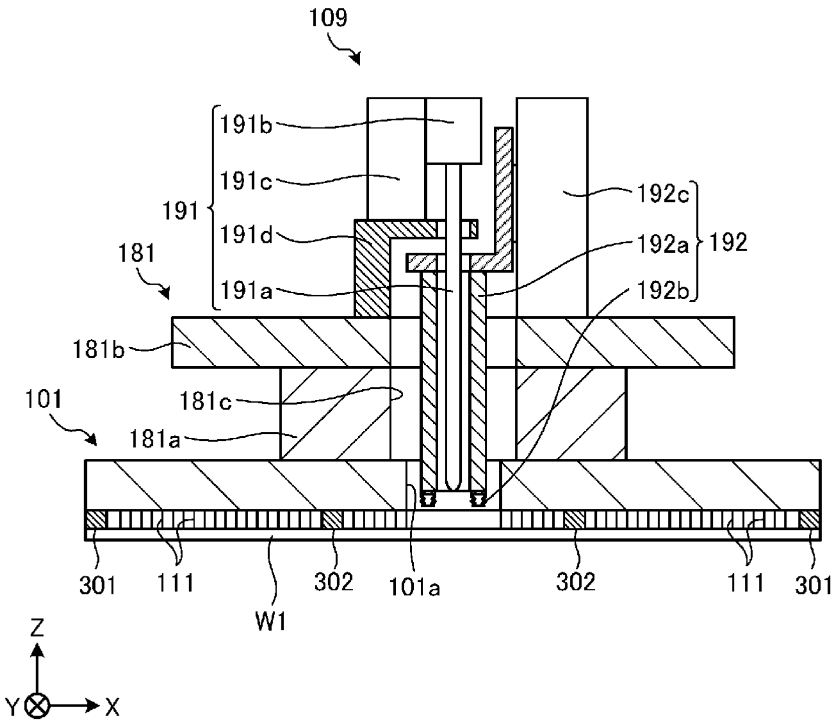
FIG. 4 is a schematic cross sectional view of a first holder, a rotation shaft, and a linearly moving device according to the exemplary embodiment.

Now, a configuration example of the first holder 101 will be explained will be discussed with reference to FIG. 4. FIG. 4 is a schematic cross sectional view of the first holder 101, the rotation shaft 181, and the linearly moving device 109 according to the exemplary embodiment.

As shown in FIG. 4, a plurality of pins 111 are provided on the bottom surface of the first holder 101 to be in contact with the top surface (non-bonding surface W1*n*) of the first substrate W1. The plurality of pins 111 have a diameter ranging from, e.g., 0.1 mm to 1 mm and a height of, e.g., several tens to hundreds of μm. The plurality of pins 111 are evenly arranged at a distance of, e.g., 2 mm.

In addition, a plurality of outer attraction members 301 and a plurality of inner attraction members 302 are provided on the bottom surface of the first holder 101 to attract the first substrate W1 by evacuation. Each of the plurality of outer attraction members 301 and the plurality of inner attraction members 302 has, for example, an arc-shaped attraction region when viewed from the top. Further, the plurality of outer attraction members 301 and the plurality of inner attraction members 302 have the same height as the pins 111. The outer attraction members 301 are arranged at an outer peripheral portion of the first holder 101 along a circumferential direction thereof. The inner attraction portions 302 are arranged along the circumferential direction at an inner side than the plurality outer attraction portions 301 in a radial direction of the first holder 101.

A through hole 101*a* is formed through a central portion of the first holder 101 in a vertical direction. A cylindrical member 192*a* to be described later is inserted into this through hole 101*a*. Further, in a central portion of the rotation shaft 181, a through hole 181*c* is formed through the cylindrical member 181*a* and the flange member 181*b*. This through hole 181*c* communicates with the through hole 101*a*, and a cylindrical member 192*a* to be described later is inserted into this through hole 181*c*.

<Configuration of Linearly Moving Mechanism>

Now, a configuration of the linearly moving device 109 will be explained with reference to FIG. 4. As depicted in FIG. 4, the linearly moving device 109 is equipped with a striker 191 and a delivery device 192.

The striker 191 includes a pressing pin 191*a*, an actuator 191*b*, a linearly moving mechanism 191*c*, and a support member 191*d*. The pressing pin 191*a* is a columnar member extending along a vertical direction, and is inserted into the cylindrical member 192*a* to be described later. The striker 191 is supported by the actuator 191*b*.

The actuator 191*b* is configured to generate a constant pressure in a certain direction (here, a vertically downward direction) by air supplied from, for example, an electro-pneumatic regulator (not shown). By the air supplied from the electro-pneumatic regulator, the actuator unit 191*b* is capable of controlling a press load applied to the central portion of the first substrate W1 when it is brought into contact with the central portion of the first substrate W1. The linearly moving mechanism 191*c* is configured to support the actuator 191*b*. Further, the linearly moving mechanism 191*c* moves the actuator 191*b* along a vertical direction by a driver incorporating therein a motor, for example. The support member 191*d* is provided on a top surface of the flange member 181*b* of the rotation shaft 181, and supports the linearly moving mechanism 191*c* such that the linearly moving mechanism 191*c* is in a distanced state from the rotation shaft 181.

The striker 191 is configured as described above, and controls a movement of the actuator 191*b* through the linearly moving mechanism 191*c*, thus controlling the press load applied to the first substrate W1 from the pressing pin 191*a* with the actuator 191*b*. With this configuration, the striker 191 presses the central portion of the first substrate W1 attracted to and held by the first holder 101 into contact with the second substrate W2.

The delivery device 192 includes the cylindrical member 192*a*, a plurality of attraction members 192*b*, and a linearly moving mechanism 192*c*. The cylindrical member 192*a* is a cylindrical component, and is inserted through the through hole 101*a* of the first holder 101 and the through hole 181*c* of the rotation shaft 181. The plurality of attraction members 192*b* are provided at a leading end of the cylindrical member 192*a*. The plurality of attraction members 192*b* are configured to attract the first substrate W1 by evacuation. The linearly moving mechanism 192*c* is configured to move the cylindrical member 192*a* along a vertical direction by a driver incorporating therein a motor, for example.

After receiving the first substrate W1 from a non-illustrated inverting mechanism belonging to the bonding apparatus 41 with the attraction members 192*b*, the delivery device 192 then raises the cylindrical member 192*a* with the linearly moving mechanism 192*c*, allowing the first substrate W1 to be handed over to the first holder 101.

<Configuration of Rotating Mechanism>

Figure 5:
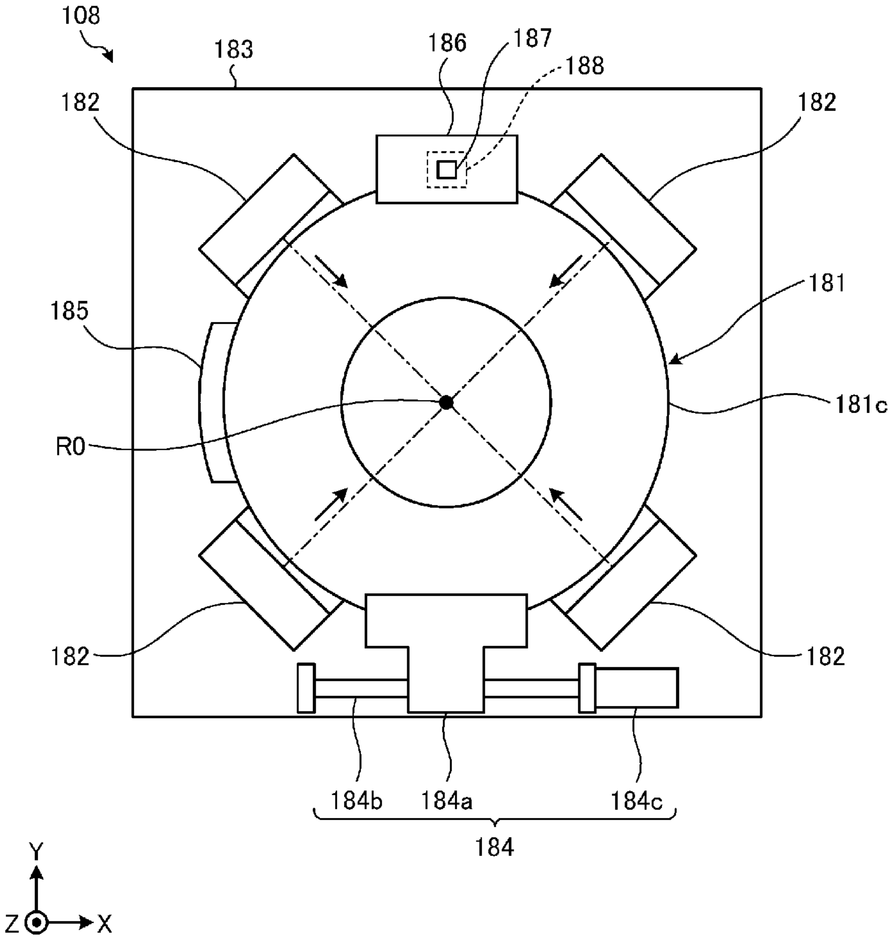
FIG. 5 is a schematic plan view of a rotating mechanism according to the exemplary embodiment.

Now, a configuration of the rotating mechanism 108 will be described with reference to FIG. 5. FIG. 5 is a schematic plan view of the rotating mechanism 108 according to the exemplary embodiment.

As depicted in FIG. 5, the rotating mechanism 108 is further equipped with a first driver 184, a position sensor 185, a damping mechanism 186, a locking mechanism 187, and a second driver 188.

The first driver 184 is, for example, a linear actuator, and includes a slider 184*a*, a screw shaft 184*b*, and a driving source 184*c*. The slider 184*a* is fixed to the rotation shaft 181 and the screw shaft 184*b*. The screw shaft 184*b* extends in a horizontal direction (here, the X-axis direction). The screw shaft 184*b* is fixed to the base 183. The driving source 184*c* is, for example, a motor, and is fixed to the base 183 to rotate the screw shaft 184*b*.

The first driver 184 is configured to rotate the screw shaft 184*b* by using the driving source 184*c*, thus allowing the slider 184*a* fixed to the screw shaft 184*b* to be moved along the X-axis direction. Thus, the first driver 184 is capable of rotating the rotation shaft 181 fixed to the slider 184*a*. The range in which the first driver 184 rotates the rotation shaft unit 181 is, for example, about ±1 degree.

The position sensor 185 (an example of a measuring device) is, by way of non-limiting example, a linear scale. The position sensor 185 is fixed to the base 183 and is configured to detect a position of the rotation shaft 181 in the horizontal direction. Although not shown here, the position sensor 185 is plural in number, and these position sensors 185 are provided at an outer periphery of the flange member 181*b* in the rotation shaft 181. For example, the rotating mechanism 108 is provided with the position sensor 185 at each of the position where the first driver 184 is provided and the position where the damping mechanism 186 is provided, in addition to the position shown in FIG. 5. The bonding apparatus 41 is capable of measuring a rotation amount (rotation angle) and an eccentric amount of the rotation shaft 181 by using these position sensors 185.

The damping mechanism 186 is configured to generate a damping force against a relative motion between the rotation shaft 181 and the base 183. The locking mechanism 187 is configured to fix the slider 202 belonging to the damping mechanism 186. Details of the locking mechanism 187 will be described later. The second driver 188 is configured to micro-drive the damping mechanism 186 to which the slider 202 is fixed.

<Configuration of Damping Mechanism, Locking Mechanism and Second Driver>

Figure 6:
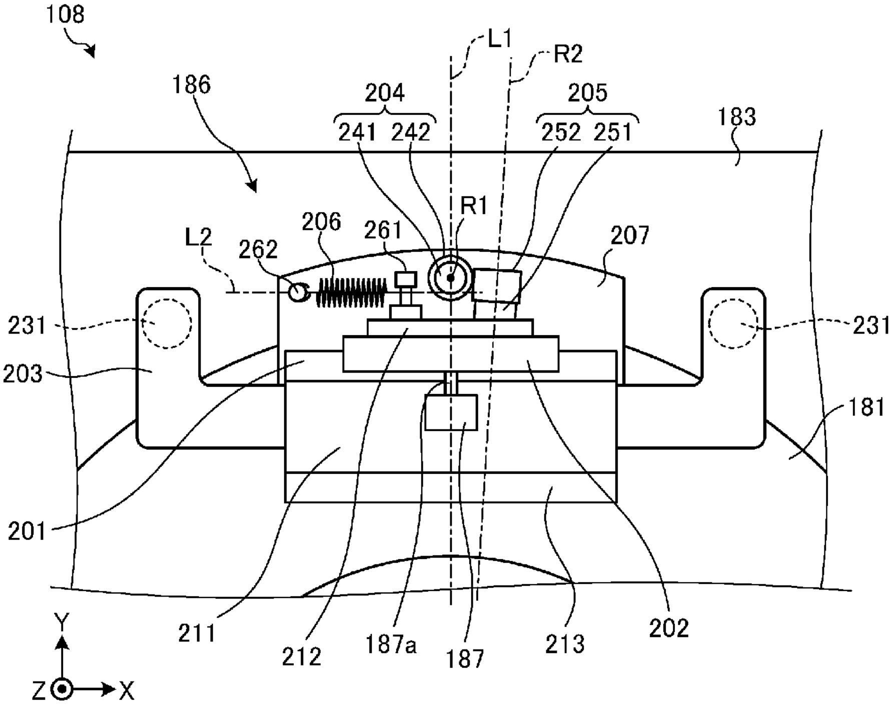
FIG. 6 is a schematic plan view of a damping mechanism, a locking mechanism, and a second driver according to the embodiment.
Figure 7:
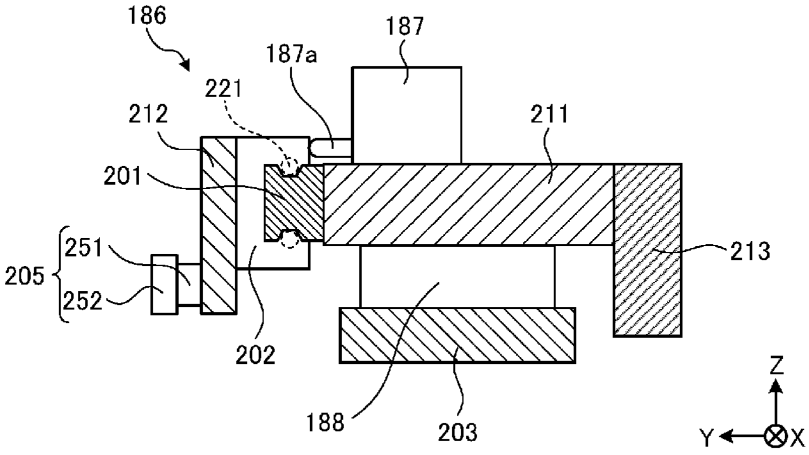
FIG. 7 is a schematic cross sectional view of the damping mechanism, the locking mechanism, and the second driver according to the exemplary embodiment.

Now, a configuration of the damping mechanism 186, the locking mechanism 187, and the second driver 188 will be explained with reference to FIG. 6 and FIG. 7. FIG. 6 is a schematic plan view of the damping mechanism 186, the locking mechanism 187, and the second driver 188 according to the exemplary embodiment. FIG. 7 is a schematic cross sectional view of the damping mechanism 186, the locking mechanism 187, and the second driver 188 according to the exemplary embodiment. FIG. 7 schematically illustrates a cross sectional view taken along a line L1 shown in FIG. 6. In FIG. 7, the slider 202, the locking mechanism 187, and the second driver 188 are shown without hatching with their internal structures omitted.

As shown in FIG. 6, the damping mechanism 186 according to the exemplary embodiment includes a rail 201, and a slider 202 configured to be linearly movable with respect to the rail 201. The slider 202 is moved while being in contact with the rail 201. That is, the slider 202 is slid with respect to the rail 201. The damping mechanism 186 according to the exemplary embodiment generates a damping force against the relative motion between the rotation shaft 181 and the base 183 by resistance generated between the rail 201 and the slider 202. In the exemplary embodiment, the rail 201 is an example of a 'fixed member,' and the slider 202 is an example of a 'moving member.

Here, the relative motion between the rotation shaft 181 and the base 183 means a displacement of the rotation shaft 181 with respect to the base 183 (detected by the plurality of position sensors 185). The relative motion between the rotation shaft 181 and the base 183 includes, for example, a horizontal movement of the rotation shaft 181 as well as a rotary motion of the rotation shaft 181 around the rotation center R0.

The horizontal movement of the rotation shaft 181 means a deviation (eccentricity) of the rotation center R0 in the horizontal direction. The horizontal movement of the rotation shaft 181 may be caused by an external factor such as, but not limited to, vibration. When the base 183 vibrates due to an external factor, the plurality of air bearings 182 fixed to the base 183 also vibrate. As a result, there may be a change in the position where the forces of the compressed air ejected from the plurality of air bearings 182 is balanced, so that the rotation shaft 181 is moved horizontally. To elaborate, the rotation shaft 181 (in other words, the rotation center R0) vibrates in a nanometer (nm) range.

The rail 201 is fixed to the base 183 with a first mounting member 203 therebetween. The first mounting member 203 has a plurality of supporting columns 231 fixed to the base 183, and supports the rail 201 at a higher position than the rotation shaft 181. The rail 201 has a straight line shape extending in a horizontal direction (here, the X-axis direction).

The slider 202 is connected to the rail 201 with a bearing 221 (see FIG. 7) therebetween, and is moved along the rail 201. The slider 202 is connected to the rotation shaft 181 via a first rotation member 204 and a second rotation member 205 to be described later, and is moved on the rail 201, following the movement of the rotation shaft 181.

In addition, the damping mechanism 186 is not limited to the shown example, and the slider 202 may be connected to the base 183 and the rail 201 may be connected to the rotation shaft 181. In other words, the slider 202 may be a 'fixed member,' and the rail 201 may be a 'moving member'.

The damping mechanism 186 also includes the first rotation member 204, the second rotation member 205, and a biasing member 206.

The first rotation member 204 is fixed to a second mounting member 207 that is fastened to the rotation shaft 181. The second rotation member 205 is fixed to the slider 202 with a second base 212 therebetween, and is moved on the rail 201 along with the slider 202. Accordingly, the slider 202 is moved on the rail 201, following the movement of the rotation shaft 181. Additionally, the second mounting member 207 may be provided with the aforementioned position sensor 185 (linear scale).

The first rotation member 204 is, by way of non-limiting example, a cam follower, and includes a first rotation shaft 241 and a first rotation body 242. The first rotation shaft 241 extends in a vertical direction. A base end of the first rotation shaft 241 is fixed to the second mounting member 207, and the first rotation shaft 241 rotatably supports the first rotation body 242 at a leading end thereof. The first rotation body 242 is, for example, a cylindrical roller, and is configured to be rotate around a rotation axis R1 extending in the vertical direction.

The second rotation member 205 is, for example, a cam follower, and includes a second rotation shaft 251 and a second rotation body 252. The second rotation shaft 251 extends in a horizontal direction. The second rotation shaft 251 has a base end fixed to the slider 202, and rotatably supports the second rotation body 252 at a leading end thereof. The second rotation body 252 is, for example, a cylindrical roller, and is configured to be rotated around a rotation axis R2 extending in the horizontal direction. The second rotation member 205 is disposed on the positive X-axis side of the first rotation member 204.

Further, the damping mechanism 186 includes a first base 211 (an example of a driving base), the second base 212, and a counterweight 213.

The first base 211 is fixed to the first mounting member 203 with the second driver 188 to be described later therebetween. The rail 201 is fixed to one lateral surface (here, a lateral surface on the positive Y-axis side) of the first base 211. The second base 212 is fixed to a lateral surface (here, a lateral surface on the positive Y-axis side) of the slider 202. The second rotation member 205 described above and a first supporting column 261 to be described later are fixed to the second base 212.

The counterweight 213 is fixed to the other lateral surface (here, a lateral surface ono the negative Y-axis side) of the first base 211. In this way, by providing the counterweight 213 on the other lateral surface of the first base 211, a load can be applied to the second driver 188 in a well-balanced manner. As a result, the precision of the micro-driving by the second driver 188 can be improved.

FIG. 6 shows the rotating mechanism 108 in an initial state in which a driving force by the first driver 184 is not applied to the rotation shaft 181. In this initial state, the first rotation body 242 of the first rotation member 204 and the second rotation body 252 of the second rotation member 205 are in contact with each other. Further, the state in which the first rotation body 242 and the second rotation body 252 are in contact with each other is maintained by the biasing member 206 to be described later.

In the initial state, the rotation axis R2 of the second rotation member 205 is inclined with respect to the line L1 connecting the rotation center R0 (see FIG. 3) of the rotation shaft 181 and the rotation axis R1 of the first rotation member 204. An angle formed by the rotation axis R2 and the line L1 is set to be larger than a rotation range (for example, ±1 degree) of the rotation shaft 181. For example, the angle formed by the rotation axis R2 and the line L1 is larger than 1 degree and less than 10 degrees.

The biasing member 206 is configured to bias the first rotation body 242 of the first rotation member 204 and the second rotation body 252 of the second rotation member 205 in a direction in which they come into contact with each other. The biasing member 206 is, for example, a tension spring, and is arranged parallel to the rail 201. Specifically, an imaginary spring axis L2 of the biasing member 206 extends in the X-axis direction. One end of the biasing member 206 is fastened to the first supporting column 261. The first supporting column 261 is fixed to the second base 212. In other words, the first supporting column 261 is fixed to the slider 202 with the second base 212 therebetween. Further, the other end of the biasing member 206 is fastened to a second supporting column 262 that is fixed to the second mounting member 207.

Moreover, in the initial state, the aforementioned line L1 extends in the Y-axis direction and is perpendicular to the spring axis L2 of the biasing member 206.

The biasing member 206 biases the slider 202 in the negative X-axis direction. As a result, the second rotation member 205 fixed to the slider 202 with the second base 212 therebetween is biased in the negative X-axis direction, that is, in the direction in which it comes into contact with the first rotation member 204. As a result, the first rotation body 242 of the first rotation member 204 and the second rotation body 252 of the second rotation member 205 are maintained in contact with each other.

For example, when minute vibration is applied to the rotation shaft 181 due to an external factor, the vibration of the rotation shaft 181 is transmitted to the rail 201 via the slider 202. As described above, sliding resistance, specifically, rolling resistance of the bearing 221 exists between the rail 201 and the slider 202. This resistance serves as the damping force against the relative motion between the rotation shaft 181 and the base 183, so that the vibration of the rotation shaft 181 can be suppressed. That is, the stability of the rotation shaft 181 can be improved.

In this way, the damping mechanism 186 according to the exemplary embodiment generates the damping force for the relative motion between the rotation shaft 181 and the base 183. Thus, even when the rotation shaft 181 is supported in the non-contact manner, the stability of the rotation center R0 can be improved. Therefore, in the bonding apparatus 41 according to the exemplary embodiment, the positioning precision for the first substrate W1 can be improved, and, besides, the bonding precision between the first substrate W1 and the second substrate W2 can be improved.

The bearing 221 is specifically a ball bearing, but it may be a roller bearing instead. Since the roller bearing is of a surface contact type, it has high vibration damping property as compared to the ball bearing which is of a point contact type. Therefore, by using the roller bearing, the stability for the relative motion between the rotation shaft 181 and the base 183 can be further improved. However, the bearing of the slider 202 is not limited to the bearing 221, and a ball bearing may be used.

In addition, the damping mechanism 186 according to the exemplary embodiment has a link mechanism by means of the first rotation member 204 and the second rotation member 205. Accordingly, the damping mechanism 186 according to the exemplary embodiment is capable of connecting the base 183 and the rotation shaft 181 mechanically while absorbing an error between the rotary motion of the rotation shaft 181 and the linear motion of the slider 202 through the rotary motions of the first rotation body 242 and the second rotation body 252.

Additionally, the first rotation member 204 and the second rotation member 205 are maintained in contact with each other due to the biasing force of the biasing member 206. Most of the biasing force of this biasing member 206 serves as a force pressing the second rotation member 205 against the first rotation member 204. However, as described above, the rotation axis R2 of the second rotation member 205 is inclined with respect to the line L1 connecting the rotation center RO (see FIG. 5) of the rotation shaft 181 and the rotation axis R1 of the first rotation member 204. In other words, the rotation axis R2 of the second rotation member 205 and the spring axis L2 of the biasing member 206 are inclined with respect to a right angle. For this reason, some of the biasing force of the biasing member 206 serves as a force that causes the rotation shaft 181 to be rotated in a direction for removing the inclination of the rotation axis R2, that is, in a counterclockwise direction there. This force functions as a preload on the rotation shaft 181.

In this way, by applying the preload to the rotation shaft 181, rigidity of the linear system composed of the rail 201 and the slider 202 can be increased. By enhancing the rigidity of the linear system, the damping mechanism 186 according to the exemplary embodiment becomes stronger against an external factor such as vibration, and more precise positioning is enabled.

Besides, in the damping mechanism 186 according to the exemplary embodiment, a change in the amount of deformation (amount of elongation) of the biasing member 206 rarely occurs within a rotational driving range of the rotation shaft 181 regardless of a change in a rotation angle. Accordingly, it becomes possible to apply a substantially constant preload at any position in positioning in the rotational direction. Therefore, with the damping mechanism 186 according to the exemplary embodiment, it is possible to improve stability while avoiding fluctuations in the positioning precision that may be caused due to a change in the applied preload.

In the initial state shown in FIG. 6, when the rotating mechanism 108 is viewed in a vertical direction, the rotation axis R1 of the first rotation member 204 is located further outside the rotation shaft 181 than the virtual spring axis L2 of the biasing member 206 is. With this layout, as compared to a case where the spring axis L2 is positioned outside the rotation axis R1, for example, an unnecessary force other than the force in the rotational direction, such as a force that moves the rotation center R0, can be suppressed from being applied to the rotation shaft 181. Therefore, with the damping mechanism 186 according to the exemplary embodiment, the positioning precision for the first substrate W1 can be further improved.

The slider 202 of the damping mechanism 186 is disposed opposite from the slider 184*a* of the first driver 184 with the center of the rotation shaft 181 therebetween (see FIG. 5 and FIG. 6). By disposing the damping mechanism 186 at this position, the damping force can be effectively generated.

The locking mechanism 187 fixes the slider 202, which is the moving member, lest the relative position between the rail 201 and the slider 202 should change, in other words, lest the slider 202 should move on the rail 201. To elaborate, the locking mechanism 187 has a contact pin 187*a*. The locking mechanism 187 moves the contact pin 187*a* toward the slider 202, thereby bringing the contact pin 187*a* into contact with the slider 202. As a result, the slider 202 is fixed, so that the relative position between the rail 201 and the slider 202 is maintained.

Here, the example case where the locking mechanism 187 is provided in the first base 211 is shown. However, the locking mechanism 187 may be embedded in the slider 202, for example. Additionally, the locking mechanism 187 may be configured to be movable on the rail 201 separately from the slider 202. In this case, the locking mechanism 187 may be connected to the second base 212 via the second base 212, for example. The locking mechanism 187 configured in this way is capable of maintaining the position of the slider 202 by bringing a brake member into contact with the rail 201.

The second driver 188 is fixed on top of the first mounting member 203. The first base 211 is fixed on top of the second driver 188. In this way, in the exemplary embodiment, the second driver 188 is provided under the damping mechanism 186.

The second driver 188 includes a piezoelectric element. In this case, the second driver 188 micro-drives the first base 211 by displacing the piezoelectric element using a piezoelectric effect. Specifically, the second driver 188 displaces the first base 211 along the same direction as the extension direction of the rail 201 (here, the X-axis direction). A displacement amount of the first base 211 by the second driver 188 (in other words, a displacement amount of the rotation shaft 181) is, for example, about ±1 μm, which is smaller than a displacement amount of the rotation shaft 181 using the first driver 184.

<Specific Operation of Bonding System>

Figure 8:
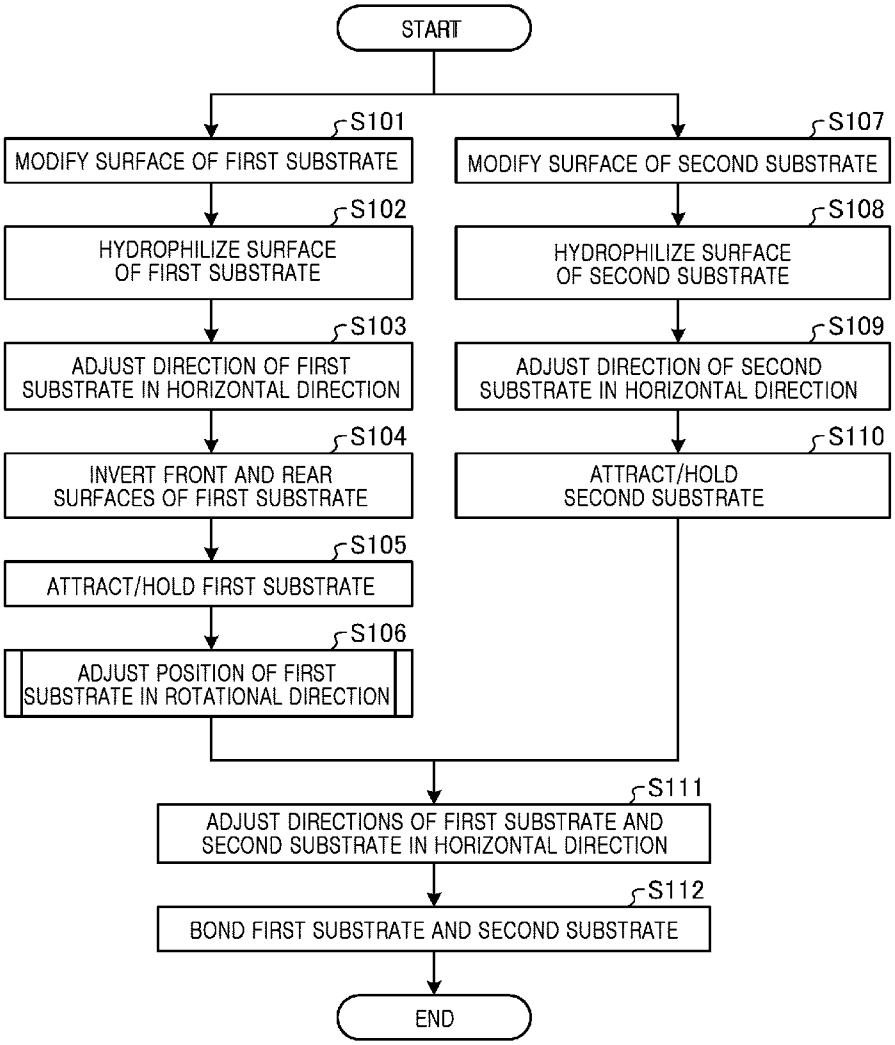
FIG. 8 is a flowchart illustrating a sequence of processings performed by the bonding system according to the exemplary embodiment.

Now, a specific operation of the bonding system 1 will be explained with reference to FIG. 8. FIG. 8 is a flowchart showing a sequence of processings performed by the bonding system 1 according to the exemplary embodiment. Various processings shown in FIG. 8 are performed based on a control by the control device 70.

First, the cassette C1 accommodating the plurality of first substrates W1, the cassette C2 accommodating the plurality of second substrates W2, and the empty cassette C3 are placed on the preset placing plates 11 of the carry-in/out station 2. Then, the first substrate W1 is taken out from the cassette C1 by the transfer device 22, and transferred into a transition device disposed within the third processing block G3.

Then, the first substrate W1 is transferred to the surface modifying apparatus 30 of the first processing block G1 by the transfer device 61. In the surface modifying apparatus 30, an oxygen gas as a processing gas is excited into plasma to be ionized under a preset decompressed atmosphere. Oxygen ions are radiated to the bonding surface of the first substrate W1, so that the bonding surface is plasma-processed. As a result, the bonding surface of the first substrate W1 is modified (process S101).

Subsequently, the first substrate W1 is transferred to the surface hydrophilizing apparatus 40 of the first processing block G1 by the transfer device 61. In the surface hydrophilizing apparatus 40, pure water is supplied onto the first substrate W1 while rotating the first substrate W1 held by the spin chuck. As a result, the bonding surface of the first substrate W1 is hydrophilized. Further, the bonding surface of the first substrate W1 is cleaned by this pure water (process S102).

Next, the first substrate W1 is transferred to the bonding apparatus 41 of the second processing block G2 by the transfer device 61. The first substrate W1 carried into the bonding apparatus 41 is then transferred into the position adjusting mechanism via the transition, and the direction of the first substrate W1 in the horizontal direction is adjusted by the position adjusting mechanism (process S103).

Thereafter, the first substrate W1 is delivered to the inverting mechanism from the position adjusting mechanism, and the front surface and the rear surface of the first substrate W1 are inverted by the inverting mechanism (process S104). To elaborate, the bonding surface W1*j* of the first substrate W1 is turned to face down. Then, the first substrate W1 is delivered to the first holder 101 from the inverting mechanism, and attracted to and held by the first holder 101 (process S105). To elaborate, after the delivery device 192 receives the first substrate W1 from the inverting mechanism by using the attraction members 192*b*, the cylindrical member 192*a* is raised by using the linearly moving mechanism 192*c* to hand the first substrate W1 over to the first holder 101. As a result, the first substrate W1 is attracted to and held by the first holder 101.

Thereafter, position adjustment of the first substrate W1 in the rotational direction is performed by using the rotating mechanism 108 (process S106). A specific sequence of the process S106 will be elaborated later. Then, the floating of the rotation shaft 181 by the plurality of air bearings 182 is released, and the rotation shaft 181 is attracted to the plurality of air bearings 182 by using a non-illustrated exhaust device. As a result, the rotation shaft 181 is fixed with its position in the rotation direction adjusted.

In parallel with the processing of the processes S101 to S106 upon the first substrate W1, a processing of the second substrate W2 is performed. First, the second substrate W2 is taken out of the cassette C2 by the transfer device 22, and transferred to the transition device disposed in the third processing block G3.

Then, the second substrate W2 is transferred to the surface modifying apparatus 30 by the transfer device 61, and the bonding surface W2*j* of the second substrate W2 is modified (process S107). Thereafter, the second substrate W2 is transferred to the surface hydrophilizing apparatus 40 by the transfer device 61, and the bonding surface W2*j* of the second substrate W2 is hydrophilized and cleaned (process S108).

Subsequently, the second substrate W2 is transferred to the bonding apparatus 41 by the transfer device 61. The second substrate W2 carried into the bonding apparatus 41 is transferred to the position adjusting mechanism via the transition. Then, the direction of the second substrate W2 in the horizontal direction is adjusted by the position adjusting mechanism (process S109).

Afterwards, the second substrate W2 is transferred to the second holder 102 to be attracted to and held by the second holder 102 with a notch thereof directed toward a predetermined direction (process S110).

Subsequently, the position adjustment between the first substrate W1 held by the first holder 101 and the second substrate W2 held by the second holder 102 in the horizontal direction is performed (process S111). Afterwards, the second substrate W2 is raised by using the elevating mechanism 105 to bond the first substrate W1 and the second substrate W2 (process S112). Specifically, after the second substrate W2 is raised, the center of the first substrate W1 is pressed downwards from above by using the pressing pin 191*a* of the striker 191 be brought into contact with the center of the second substrate W2, so that the first substrate W1 and the second substrate W2 are bonded too each other.

Figure 9:
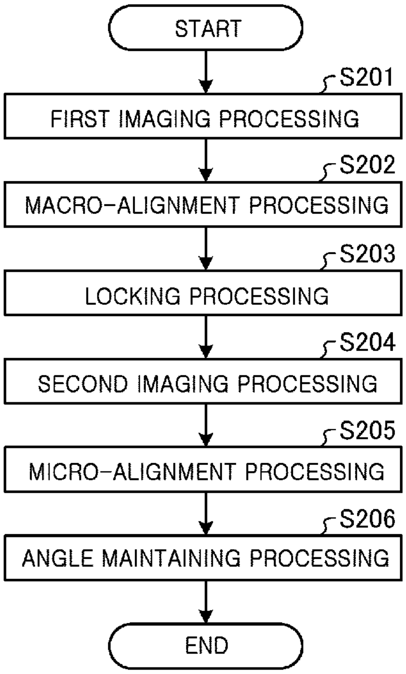
FIG. 9 is a flowchart illustrating a first example of a specific sequence of a processing described in a process S106.

Now, an example of the specific sequence of the position adjustment in the rotational direction of the first substrate W1 in the process S106 will be described with reference to FIG. 9. FIG. 9 is a flowchart showing a first example of the specific sequence of the processing described in the process S106.

As depicted in FIG. 9, the controller 71 first performs a first imaging processing (process S201). In the first imaging processing, the controller 71 images the bonding surface W1*j*, which is a non-held surface of the first substrate W1, by using the lower imaging device 104. The controller 71 calculates a rotation angle of the first substrate W1 from the image obtained by the lower imaging device 104.

Then, the controller 71 performs a macro-alignment processing (process S202). In the micro-alignment processing, the controller 71 controls the first driver 184 to rotate the rotation shaft 181 based on the imaging result obtained by the first imaging processing. As an example, the controller 71 controls the first driver 184 to rotate the rotation shaft 181 such that the rotation angle of the first substrate W1 approaches the rotation angle of the second substrate W2. The rotation angle of the second substrate W2 can be calculated from an imaging result of the bonding surface W2*j* of the second substrate W2 obtained by the upper imaging device 103.

Subsequently, the controller 71 performs a locking processing (process S203). In the locking processing, the controller 71 controls the locking mechanism 187 to bring the contact pin 187*a* into contact with the slider 202. As a result, the slider 202 is fixed, and the relative position between the rail 201 and the slider 202 is maintained.

Thereafter, the controller 71 performs a second imaging processing (process S204). In the second imaging processing, the controller 71 images the bonding surface W1*j* of the first substrate W1 by using the lower imaging device 104. The controller 71 re-calculates the rotation angle of the first substrate W1 from the image obtained by the lower imaging device 104.

Then, the controller 71 performs a micro-alignment processing (process S205). In the micro-alignment processing, the controller 71 controls the second driver 188 based on the imaging result obtained by the second imaging processing to micro-drive the damping mechanism 186, thus allowing the rotation shaft 181 to be rotated. As an example, the controller 71 controls the second driver 188 to slightly displace the damping mechanism 186 in the positive X-axis direction or negative X-axis direction such that the rotation angle of the first substrate W1 coincides with the rotation angle of the second substrate W2. Afterwards, the controller 71 measures the rotation angle of the rotation shaft 181 by using a plurality of position sensors 185, and stores the measured rotation angle in the storage 72.

Subsequently, the controller 71 performs an angle maintaining processing (process S206). In the angle maintaining processing, the controller 71 micro-drives the damping mechanism 186 by using the second driver 188 such that the rotation angle of the rotation shaft 181 measured in the process S205 is maintained. Specifically, the controller 71 measures the rotation angle of the rotation shaft 181 by using the plurality of position sensors 185 in the process S206. Then, when a difference between the measured rotation angle and the rotation angle measured in the process S205 exceeds a threshold value, the controller 71 controls the second driver 188 to micro-drive the damping mechanism 186 to thereby return the rotation angle of the rotation shaft 181 to the rotation angle measured in the process S205. As a result, the rotation angle of the rotation shaft 181 is maintained at the rotation angle in the process S205. That is, the bonding apparatus 41 is capable of maintaining the state in which the rotation angle of the first substrate W1 and the rotation angle of the second substrate W2 are identical.

Figure 10:
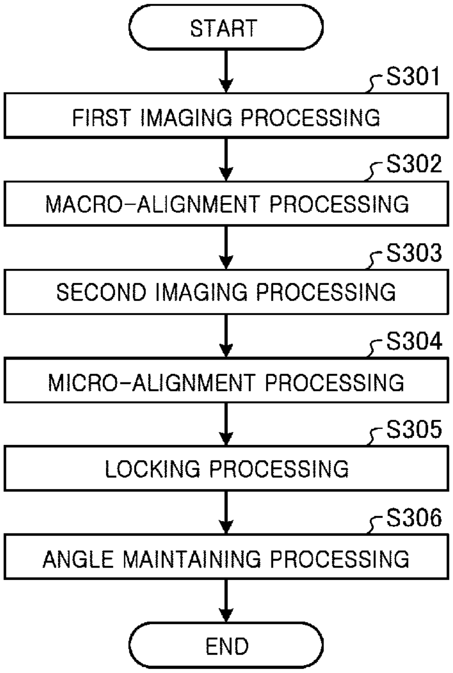
FIG. 10 is a flowchart illustrating a second example of the specific sequence of the processing described in the process S106.

Now, a second example of the specific sequence of the processing shown in the process S106 will be described with reference to FIG. 10. FIG. 10 is a flowchart showing the second example of the specific sequence of the processing described in the process S106.

As shown in FIG. 10, after performing a first imaging processing (process S301) and a macro-alignment processing (process S302), the controller 71 may perform a second imaging processing (process S302) and a micro-alignment processing (process S304) without performing a locking processing. In the micro-alignment processing in the process S304, the controller 71 rotates the rotation shaft 181 by using the first driver 184 rather than the second driver 188. Thereafter, the controller 71 performs a lock processing (process S305) and an angle maintaining processing (process S306).

In this way, the controller 71 may perform the locking processing after the micro-alignment processing is completed.

Figure 11:
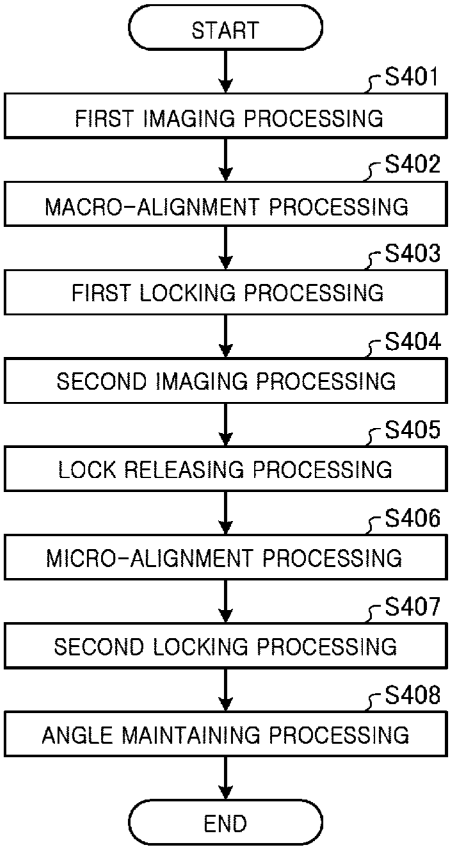
FIG. 11 is a flowchart illustrating a third example of the specific sequence of the processing described in the process S106.

Now, a third example of the specific sequence of the processing shown in the process S106 will be described with reference to FIG. 11. FIG. 11 is a flowchart showing the third example of the specific sequence of the processing described in the process S106.

As depicted in FIG. 11, the controller 71 performs a first locking processing (process S403) after carrying out a first imaging processing (process S401) and a macro-alignment processing (process S402). The content of the first lock processing is the same as that of the lock processing in the process S203. Thereafter, the controller 71 performs a lock releasing processing (process S405) after performing a second imaging processing (process S404). In the locking processing, the controller 71 controls the locking mechanism 187 to move the contact pin 187*a*, thereby disconnecting the contact pin 187*a* from the slider 202.

Then, the controller 71 performs a micro-alignment processing (process S406), and then performs a second lock processing (process S407) and an angle maintaining processing (process S408). The content of the micro-alignment processing in the process S406 is the same as that of the micro-alignment processing in the process S304. That is, the controller 71 controls the first driver 184 to rotate the rotation shaft 181. The content of the second lock processing is the same as that of the lock processing in the process S203.

In this way, the controller 71 keeps the slider 202 fixed while the second imaging processing is being performed. Therefore, it is possible to suppress a positional displacement of the rotation shaft 181 due to vibration caused by a movement of the lower imaging device 104, for example.

Another Exemplary Embodiment

Figure 12:
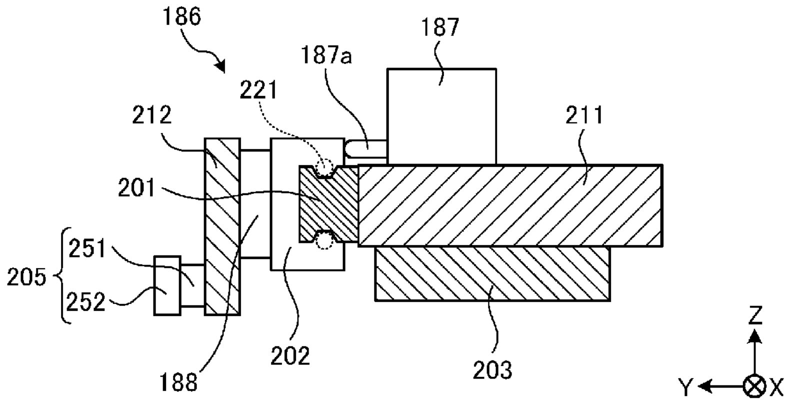
FIG. 12 is a schematic cross sectional view of a damping mechanism, a locking mechanism, and a second driver according to another exemplary embodiment.

FIG. 12 is a schematic cross-sectional view of the damping mechanism 186, the locking mechanism 187, and the second driver 188 according to another exemplary embodiment.

As shown in FIG. 12, the second driver 188 may be disposed between the slider 202 and the second base 212 (another example of the driving base). That is, the second driver 188 may be fixed to the slider 202, and the second base 212 may be fixed to the slider via this second driver 188.

With this configuration, a portion of the damping mechanism 186 that is subjected to micro-driving can be made small, so that the rotation shaft 181 can be micro-driven with higher precision. Further, in this case, since the counterweight 213 is unnecessary, scale-up of the damping mechanism 186 can be suppressed.

Additionally, the present disclosure may also adopt the following configurations.

(1) A substrate positioning device including a holder configured to hold a substrate; and a rotating mechanism configured to rotate the holder, wherein the rotating mechanism includes:

- a rotation shaft fixed to the holder;
- a bearing configured to support the rotation shaft in a non-contact manner;
- a base configured to fix the bearing;
- a first driver configured to rotate the rotation shaft;
- a damping mechanism including a fixed member connected to a first one of the base and the rotation shaft, and a moving member connected to a second one of the base and the rotation shaft and configured to be slid with respect to the fixed member, the damping mechanism being configured to generate a damping force against a relative motion between the rotation shaft and the base;

a locking mechanism configured to lock the moving member; and a second driver configured to micro-drive the damping mechanism to which the moving member is fixed.

(2) The substrate positioning device described in (1), wherein the second driver includes a piezoelectric element.

(3) The substrate positioning device described in (1) or (2), wherein the second driver is disposed under the damping mechanism.

(4) The substrate positioning device described in (3), wherein the damping mechanism includes:

a driving base, disposed on the second driver, having a first end to which the fixed member is fixed; and a counterweight fixed to a second end of the driving base.

(5) The substrate positioning device described in any one of (1) to (4), wherein the locking mechanism is disposed on the driving base.

(6) The substrate positioning device described in (1) or (2), wherein the second driver is fixed to the moving member, and the damping mechanism includes:

a driving base fixed to the moving member with the second driver therebetween;

a first rotation member fixed to the rotation shaft;

a second rotation member fixed to the driving base;

a first supporting column fixed to the driving base;

a second supporting column fixed to the rotation shaft; and a biasing member connected to the first supporting column and the second supporting column, and configured to bias the first rotation member and the second rotation member in a direction in which the first rotation member and the second rotation member come into contact with each other.

(7) The substrate positioning device described in any one of (1) to (6), further including:

an imaging device configured to image a non-held surface of the substrate held by the holder; and a controller configured to control the rotating mechanism, wherein the controller performs a first imaging processing of imaging the non-held surface of the substrate by using the imaging device, a macro-alignment processing of controlling the first driver to rotate the rotation shaft based on an imaging result obtained by the first imaging processing, a locking processing of controlling, after the macro-alignment processing, the locking mechanism to fix the moving member, a second imaging processing of imaging, after the locking processing, the non-held surface of the substrate by using the imaging device, and a micro-alignment processing of rotating the rotation shaft by controlling the second driver to micro-drive the damping mechanism based on an imaging result obtained by the second imaging processing.

(8) The substrate positioning device described in (7), further including:

a measurer configured to measure a rotation angle of the rotation shaft, wherein the controller performs, after the micro-alignment processing, an angle maintaining processing of rotating the rotation shaft by controlling the second driver to micro-drive the damping mechanism based on a measurement result obtained by the measurer.

(9) The substrate positioning device described in any one of (1) to (6), further including:

an imaging device configured to image a non-held surface of the substrate held by the holder; and a controller configured to control the rotating mechanism, wherein the controller performs a first imaging processing of imaging the non-held surface of the substrate by using the imaging device, a macro-alignment processing of controlling the first driver to rotate the rotation shaft based on an imaging result obtained by the first imaging processing, a second imaging processing of imaging, after the macro-alignment processing, the non-held surface of the substrate by using the imaging device, a micro-alignment processing of controlling the first driver to rotate the rotation shaft based on an imaging result obtained by the second imaging processing, and a locking processing of controlling, after the micro-alignment processing, the locking mechanism to fix the moving member.

(10) The substrate positioning device described in (9), further including:

a measurer configured to measure a rotation angle of the rotation shaft, wherein the controller performs, after the locking processing, an angle maintaining processing of rotating the rotation shaft by controlling the second driver to micro-drive the damping mechanism based on a measurement result obtained by the measurer.

(11) The substrate positioning device described in any one of (1) to (6), further including:

an imaging device configured to image a non-held surface of the substrate held by the holder; and a controller configured to control the rotating mechanism, wherein the controller performs a first imaging processing of imaging the non-held surface of the substrate by using the imaging device, a macro-alignment processing of controlling the first driver to rotate the rotation shaft based on an imaging result obtained by the first imaging processing, a first locking processing of controlling, after the macro-alignment processing, the locking mechanism to fix the moving member, a second imaging processing of imaging, after the first locking processing, the non-held surface of the substrate by using the imaging device, a lock releasing processing of controlling, after the second imaging processing, the locking mechanism to release the fixing of the moving member, a micro-alignment processing of controlling, after the lock releasing processing, the first driver to rotate the rotation shaft based on an imaging result obtained by the second imaging processing, and a second locking processing of controlling, after the micro-alignment processing, the locking mechanism to fix the moving member.

(12) The substrate positioning device described in (11), further including:

a measurer configured to measure a rotation angle of the rotation shaft, wherein the controller performs, after the second locking processing, an angle maintaining processing of rotating the rotation shaft by controlling the second driver to micro-drive the damping mechanism based on a measurement result obtained by the measurer.

(13) A substrate positioning method including:

holding a substrate by a holder configured to hold the substrate; and performing positioning of the substrate in a rotational direction by a rotating mechanism configured to rotate the holder, the rotating mechanism including: a rotation shaft fixed to the holder; a bearing configured to support the rotation shaft in a non-contact manner; a base configured to fix the bearing; a first driver configured to rotate the rotation shaft; a damping mechanism including a fixed member connected to a first one of the base and the rotation shaft, and a moving member connected to a second one of the base and the rotation shaft and configured to be slid with respect to the fixed member, the damping mechanism being configured to generate a damping force against a relative motion between the rotation shaft and the base; a locking mechanism configured to lock the moving member; and a second driver configured to micro-drive the damping mechanism to which the moving member is fixed.

(14) A bonding apparatus including:

a first holder configured to attract and hold a first substrate from above;

a second holder disposed below the first holder, and configured to attract and hold a second substrate from below;

a moving mechanism configured to bring a first one of the first holder and the second holder closer to a second one thereof; and a rotating mechanism configured to rotate the first holder, wherein the rotating mechanism includes:

a rotation shaft fixed to the first holder;

a bearing configured to support the rotation shaft in a non-contact manner;

a base configured to fix the bearing;

a first driver configured to rotate the rotation shaft;

a damping mechanism including a fixed member connected to a first one of the base and the rotation shaft, and a moving member connected to a second one of the base and the rotation shaft and configured to be slid with respect to the fixed member, the damping mechanism being configured to generate a damping force against a relative motion between the rotation shaft and the base;

a locking mechanism configured to lock the moving member; and a second driver configured to micro-drive the damping mechanism to which the moving member is fixed.

According to the exemplary embodiment, it is possible to improve the positioning precision for the substrate.

It should be noted that the above-described exemplary embodiments are illustrative in all aspects and are not anyway limiting. In fact, the above-described exemplary embodiments can be embodied in various forms. Further, the above-described exemplary embodiments may be omitted, replaced and modified in various ways without departing from the scope and the spirit of claims.

I claim:

1. A substrate positioning device, comprising:

a holder configured to hold a substrate; and a rotating mechanism configured to rotate the holder, wherein the rotating mechanism comprises:

a rotation shaft fixed to the holder;

a bearing configured to support the rotation shaft in a non-contact manner;

a base configured to fix the bearing;

a first driver configured to rotate the rotation shaft;

a damping mechanism comprising a fixed member connected to a first one of the base and the rotation shaft, and a moving member connected to a second one of the base and the rotation shaft and configured to be slid with respect to the fixed member, the damping mechanism being configured to generate a damping force against a relative motion between the rotation shaft and the base;

a locking mechanism configured to lock the moving member; and a second driver configured to micro-drive the damping mechanism to which the moving member is fixed.

2. The substrate positioning device of claim 1, wherein the second driver comprises a piezoelectric element.

3. The substrate positioning device of claim 1, wherein the second driver is disposed under the damping mechanism.

4. The substrate positioning device of claim 3, wherein the damping mechanism comprises:

a driving base, disposed on the second driver, having a first end to which the fixed member is fixed; and a counterweight fixed to a second end of the driving base.

5. The substrate positioning device of claim 4, wherein the locking mechanism is disposed on the driving base.

6. The substrate positioning device of claim 1, wherein the second driver is fixed to the moving member, and the damping mechanism comprises:

a driving base fixed to the moving member with the second driver therebetween;

a first rotation member fixed to the rotation shaft;

a second rotation member fixed to the driving base;

a first supporting column fixed to the driving base;

a second supporting column fixed to the rotation shaft; and a biasing member connected to the first supporting column and the second supporting column, and configured to bias the first rotation member and the second rotation member in a direction in which the first rotation member and the second rotation member come into contact with each other.

7. The substrate positioning device of claim 1, further comprising:

an imaging device configured to image a non-held surface of the substrate held by the holder; and a controller configured to control the rotating mechanism, wherein the controller performs a first imaging processing of imaging the non-held surface of the substrate by using the imaging device, a macro-alignment processing of controlling the first driver to rotate the rotation shaft based on an imaging result obtained by the first imaging processing, a locking processing of controlling, after the macro-alignment processing, the locking mechanism to fix the moving member, a second imaging processing of imaging, after the locking processing, the non-held surface of the substrate by using the imaging device, and a micro-alignment processing of rotating the rotation shaft by controlling the second driver to micro-drive the damping mechanism based on an imaging result obtained by the second imaging processing.

8. The substrate positioning device of claim 7, further comprising:

a measurer configured to measure a rotation angle of the rotation shaft, wherein the controller performs, after the micro-alignment processing, an angle maintaining processing of rotating the rotation shaft by controlling the second driver to micro-drive the damping mechanism based on a measurement result obtained by the measurer.

9. The substrate positioning device of claim 1, further comprising:

an imaging device configured to image a non-held surface of the substrate held by the holder; and a controller configured to control the rotating mechanism, wherein the controller performs a first imaging processing of imaging the non-held surface of the substrate by using the imaging device, a macro-alignment processing of controlling the first driver to rotate the rotation shaft based on an imaging result obtained by the first imaging processing, a second imaging processing of imaging, after the macro-alignment processing, the non-held surface of the substrate by using the imaging device, a micro-alignment processing of controlling the first driver to rotate the rotation shaft based on an imaging result obtained by the second imaging processing, and a locking processing of controlling, after the micro-alignment processing, the locking mechanism to fix the moving member.

10. The substrate positioning device of claim 9, further comprising:

a measurer configured to measure a rotation angle of the rotation shaft, wherein the controller performs, after the locking processing, an angle maintaining processing of rotating the rotation shaft by controlling the second driver to micro-drive the damping mechanism based on a measurement result obtained by the measurer.

11. The substrate positioning device of claim 1, further comprising:

an imaging device configured to image a non-held surface of the substrate held by the holder; and a controller configured to control the rotating mechanism, wherein the controller performs a first imaging processing of imaging the non-held surface of the substrate by using the imaging device, a macro-alignment processing of controlling the first driver to rotate the rotation shaft based on an imaging result obtained by the first imaging processing, a first locking processing of controlling, after the macro-alignment processing, the locking mechanism to fix the moving member, a second imaging processing of imaging, after the first locking processing, the non-held surface of the substrate by using the imaging device, a lock releasing processing of controlling, after the second imaging processing, the locking mechanism to release the fixing of the moving member, a micro-alignment processing of controlling, after the lock releasing processing, the first driver to rotate the rotation shaft based on an imaging result obtained by the second imaging processing, and a second locking processing of controlling, after the micro-alignment processing, the locking mechanism to fix the moving member.

12. The substrate positioning device of claim 11, further comprising:

a measurer configured to measure a rotation angle of the rotation shaft, wherein the controller performs, after the second locking processing, an angle maintaining processing of rotating the rotation shaft by controlling the second driver to micro-drive the damping mechanism based on a measurement result obtained by the measurer.

13. A substrate positioning method, the method comprising the steps of:

holding a substrate by a holder;

rotating the holder by a first driver to position the substrate in a rotational direction, the first driver being configured to rotate a rotation shaft fixed to the holder, the rotation shaft being supported in a non-contact manner by a bearing fixed to a base;

generating a damping force against a relative motion between the rotation shaft and the base by a damping mechanism, the damping mechanism including a fixed member connected to a first one of the base and the rotation shaft, and a moving member connected to a second one of the base and the rotation shaft, the moving member being configured to be slid with respect to the fixed member and locked by a locking mechanism; and micro-driving the damping mechanism by a second driver to adjust the position of the substrate in the rotational direction.

14. A bonding apparatus, comprising:

a first holder configured to attract and hold a first substrate from above;

a second holder disposed below the first holder, and configured to attract and hold a second substrate from below;

a moving mechanism configured to bring a first one of the first holder and the second holder closer to a second one thereof; and a rotating mechanism configured to rotate the first holder, wherein the rotating mechanism comprises:

a rotation shaft fixed to the first holder;

a bearing configured to support the rotation shaft in a non-contact manner;

a base configured to fix the bearing;

a first driver configured to rotate the rotation shaft;

a damping mechanism comprising a fixed member connected to a first one of the base and the rotation shaft, and a moving member connected to a second one of the base and the rotation shaft and configured to be slid with respect to the fixed member, the damping mechanism being configured to generate a damping force against a relative motion between the rotation shaft and the base;

a locking mechanism configured to lock the moving member; and a second driver configured to micro-drive the damping mechanism to which the moving member is fixed.

* * * * *